United States Patent
Olgeirsson et al.

(10) Patent No.: US 10,422,687 B1
(45) Date of Patent: Sep. 24, 2019

(54) SYSTEM AND METHOD OF BATCHING A PRECISE WEIGHT OF CANNABIS INFLORESCENCES

(71) Applicant: GREEN VAULT SYSTEMS LLC, Snohomish, WA (US)

(72) Inventors: Arnar Kristjan Olgeirsson, Shoreline, WA (US); Robert Dennis Smith, Snohomish, WA (US); Birgir Johannesson, Lynnwood, WA (US)

(73) Assignee: GREEN VAULT SYSTEMS LLC, Snohomish, WA (US)

( * ) Notice: Subject to any disclaimer, the term of this patent is extended or adjusted under 35 U.S.C. 154(b) by 169 days.

(21) Appl. No.: 15/658,986

(22) Filed: Jul. 25, 2017

Related U.S. Application Data

(60) Provisional application No. 62/366,519, filed on Jul. 25, 2016.

(51) Int. Cl.
   *G01G 19/387* (2006.01)
   *B07C 5/22* (2006.01)

(52) U.S. Cl.
   CPC .............. *G01G 19/387* (2013.01); *B07C 5/22* (2013.01)

(58) Field of Classification Search
   CPC ....... G01G 19/387; G01G 19/393; B07C 5/22
   See application file for complete search history.

(56) References Cited

U.S. PATENT DOCUMENTS

| | | | |
|---|---|---|---|
| 2,470,916 A | 5/1949 | Carruthers | |
| 4,206,822 A * | 6/1980 | Mazzucchelli | G01G 13/026 177/25.18 |
| 4,385,671 A * | 5/1983 | Hirano | G01G 13/247 177/25.18 |
| 4,428,179 A * | 1/1984 | Jordan | G01G 19/393 177/23 |
| 4,511,009 A * | 4/1985 | Kataoka | G01G 19/393 177/1 |
| 4,561,509 A * | 12/1985 | Sakakibara | G01G 13/026 177/145 |
| 4,566,549 A * | 1/1986 | Oshima | B08B 5/02 177/245 |
| 4,720,961 A * | 1/1988 | Jordan | G01G 19/393 177/1 |
| 5,246,118 A * | 9/1993 | Mosher | B07C 5/28 177/52 |
| 6,437,256 B1 * | 8/2002 | Miyamoto | G01G 19/393 177/25.18 |
| 8,158,895 B2 | 4/2012 | Grundtvig et al. | |

(Continued)

OTHER PUBLICATIONS

American Herbal Pharmacopoeia, Scotts Valley, CA, Cannabis Inflorescence and Leaf, 2013.

*Primary Examiner* — Randy W Gibson
(74) *Attorney, Agent, or Firm* — Timothy E. Siegel Patent Law, PLLC; Timothy E. Siegel

(57) ABSTRACT

A method of delivering a set of nonuniform *cannabis* inflorescences ("buds") that fit within a target weight range. The method includes iteratively weighing a bud and automatically placing the weighed bud into one holding bin, out of a set of holding bins and automatically determining if the weight of any combination of the contents of the set of holding bins fits within the target weight range. When a combination of the contents of the holding bins fits within the target weight range, combining these holding bin contents together.

16 Claims, 4 Drawing Sheets

(56) References Cited

U.S. PATENT DOCUMENTS

| | | | |
|---|---|---|---|
| 8,857,625 B1 | 10/2014 | Oropeza | |
| 10,036,664 B2 * | 7/2018 | Chandler | ............... G01G 19/52 |
| 10,184,823 B2 * | 1/2019 | Debus | .................. G01G 13/003 |

* cited by examiner

US 10,422,687 B1

SYSTEM AND METHOD OF BATCHING A PRECISE WEIGHT OF CANNABIS INFLORESCENCES

BACKGROUND

*Cannabis* Inflorescences, more commonly (and henceforth) referred to as "buds" are a particular challenge to batch to a specific weight, such as 1 gram, 3.5 grams or 7 grams, the typical amounts sold. The buds are irregularly sized, valuable (so that precise weighing is important), having a mass (henceforth "weigh") between 0.2 grams and 2 grams, and are delicate and have a low density (adding to the difficulty of robotic handling). Further, although there is a typical bud shape, it is not one that readily lends itself to handling by automated equipment, and there is shape variation. Accordingly, although there are many systems for batching product, none available before now could successfully batch buds, with the precision needed to be commercially feasible. Accordingly, the work of batching buds has been done by hand, and has been labor intensive and expensive for those offering packaged buds.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a method of delivering a set of nonuniform *cannabis* inflorescences ("buds") that fit within a target weight range. The method includes iteratively weighing a bud and automatically placing the weighed bud into one holding bin, out of a set of holding bins and automatically determining if the weight of any combination of the contents of the set of holding bins fits within the target weight range. When a combination of the contents of the holding bins fits within the target weight range, combining these holding bin contents together.

In a second separate aspect, the present invention may take the form of an apparatus for delivering a set of nonuniform product pieces that fit within a target weight range, that has at least one upwardly facing product piece entrance and at least one weighing platform, shaped as an upwardly facing shallow bowl, positioned beneath the product piece entrance. For each weighing platform, a load cell is positioned to weigh the contents of each weighing platform. Also, a vertical pathway leads from the product piece entrance to the weighing platform, so that product pieces dropped through the product piece entrance are guided to the weighing platform. Further, each one of a set of holding bins, is positioned to receive product pieces from one of the at least one weighing platforms and there are a set of weighing-platform air blowers, each of which is positioned and adapted to blow a set of product pieces from the weighing platform into a unique one of the holding bins. Also, there is at least one holding bin air blower for each holding bin, capable of ejecting product pieces in the holding bin out of the holding bin. Further, a holding bins exit assembly, is configured to guide product pieces ejected from the holding bins to a common exit. Finally, a computer implemented control unit, including computer readable memory, is responsive to the weighing platform and controlling all the air blowers, programmed to: select and activate a weighing-platform air blower to blow a set of product pieces from the weighing platform to a holding bin, after weight information is received from the weighing platform; maintain in computer memory the weight of the contents of each the holding bin and computing the sum of weights of every possible combination of holding bin contents and comparing each the sum of weights with a weight range; and when a sum of weights falls within the weight range, activating the holding bin blowers corresponding to the holding bins whose contents sum to the weight range, to eject the product pieces into the holding bins exit assembly to the common exit.

BRIEF DESCRIPTION OF DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only, of selected embodiments and not all possible implementations and are not intended to limit the scope of the present disclosure. Also, the drawings included herein are considered by the applicant to be informal.

DETAILED DESCRIPTION OF THE PREFERRED EMBODIMENTS

Preceding and following embodiments and descriptions are for illustrative purposes only and are not intended to limit the scope of this disclosure. Other aspects and advantages of this disclosure will become apparent from the following detailed description.

Figure 1:
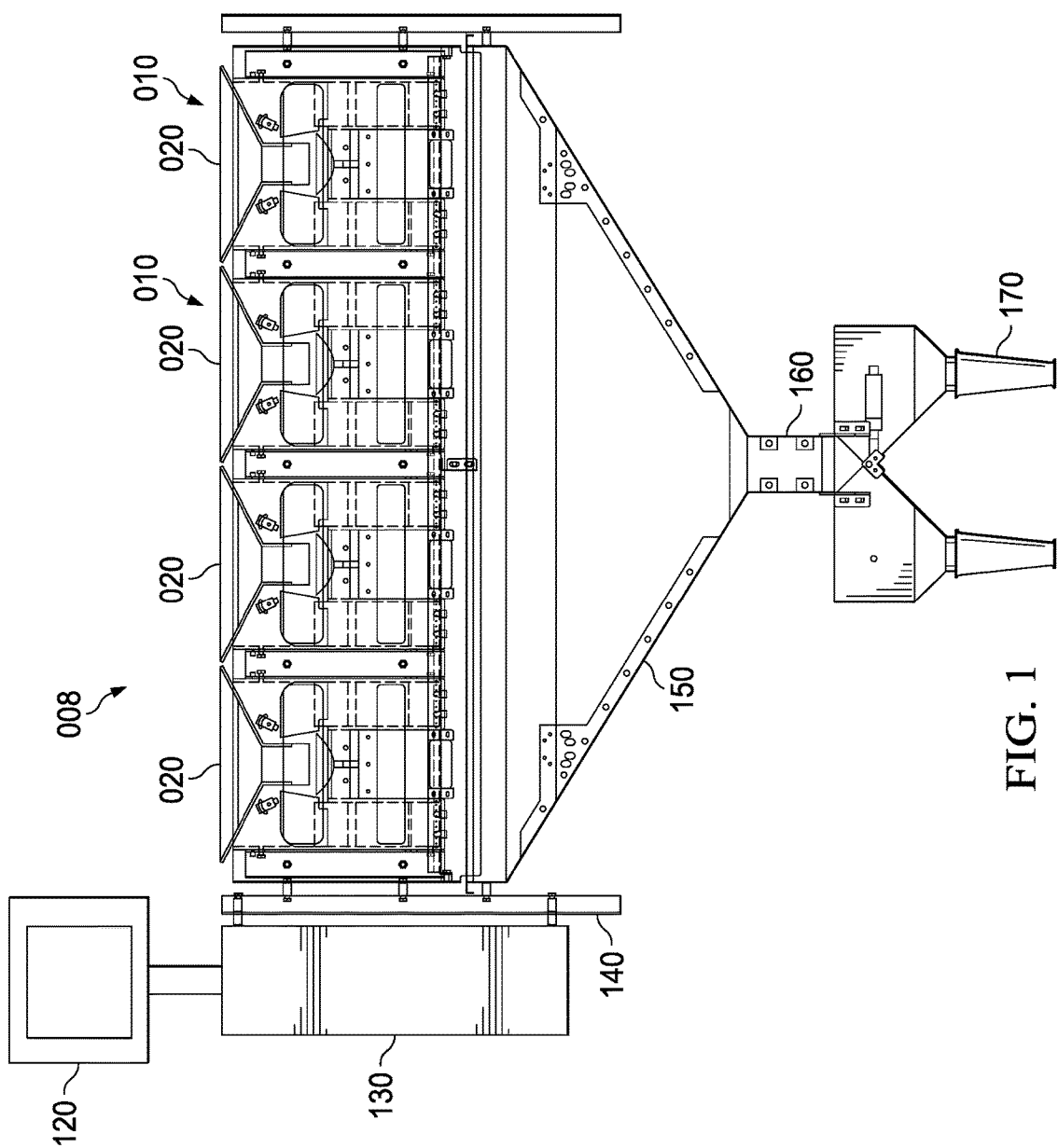
FIG. 1 is a front view of a dual release-nozzle embodiment of batching device according to the present invention.
Figure 5:
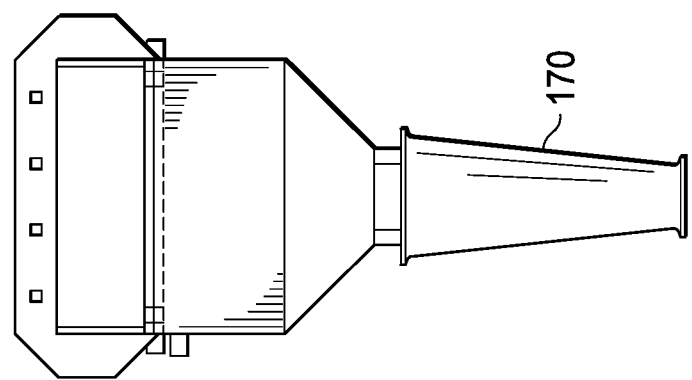
FIG. 5 is a side view of the packing station assembly.

Referring to FIG. 1, in gross overview, a weighing and batching assembly 008 includes a data entry device (part of control panel 130), permitting a user to introduce a target weight and an overage limit, yielding the target weight range, which is the range between the target weight and the target weight plus the overage limit. In a preferred embodiment, the assembly 008 includes eight parallel weighing assemblies 010 each including a material loading hopper 020, which each accept product pieces, in general, but more specifically *cannabis* inflorescences (buds), that are introduced sequentially by a user and direct each bud to a weighing platform 060 (FIGS. 2 and 3) associated with the loading hopper 020. Two holding bins 080 (FIGS. 2 and 3) are associated with each weighing platform 060, with a blower set to blow a first bud introduced into the weighing platform into one bin 080 (after it is weighed) and a second bud introduced into the weighing platform 060 into the second bin 080, so that sixteen buds, two for each of the eight weighing platforms 060, can be introduced into the assembly 008, in a single batching attempt. As buds are introduced, weighed and stored in holding bins 080, a data processing assembly (FIG. 6) keeps track of the product weight (having an industry term of "weighment") of each holding bin 080, and determines every possible combination of bin content weights to determine if any combination of bin content weights falls within the target weight range. If this condition occurs, the contents of the holding bins 080 that make up this combination are released simultaneously and combined together by a batch funnel 150 (FIG. 5). In a preferred embodiment, a user may enter multiple product weight ranges, and more than one may be active simultaneously, so that each time a combination of holding cell content weights is found to fall within one of the active target weight ranges, a batching operation is initiated. If content is added to all sixteen of bins 080, and no combination of bin weights falls within the weight range, the user is advised of this condition, some or all of the holding bin contents are ejected and the controller 120 starts to look for new weight combinations as new product is introduced by the user.

Returning to FIG. 1 the set of eight weighing units 010 (four of which are hidden from view, behind the four weighing units 010 that are shown) are located above a batch funnel 150. Weighed product is directed from the weighing units to the batch funnel 150 by gravitational action.

Figure 3:
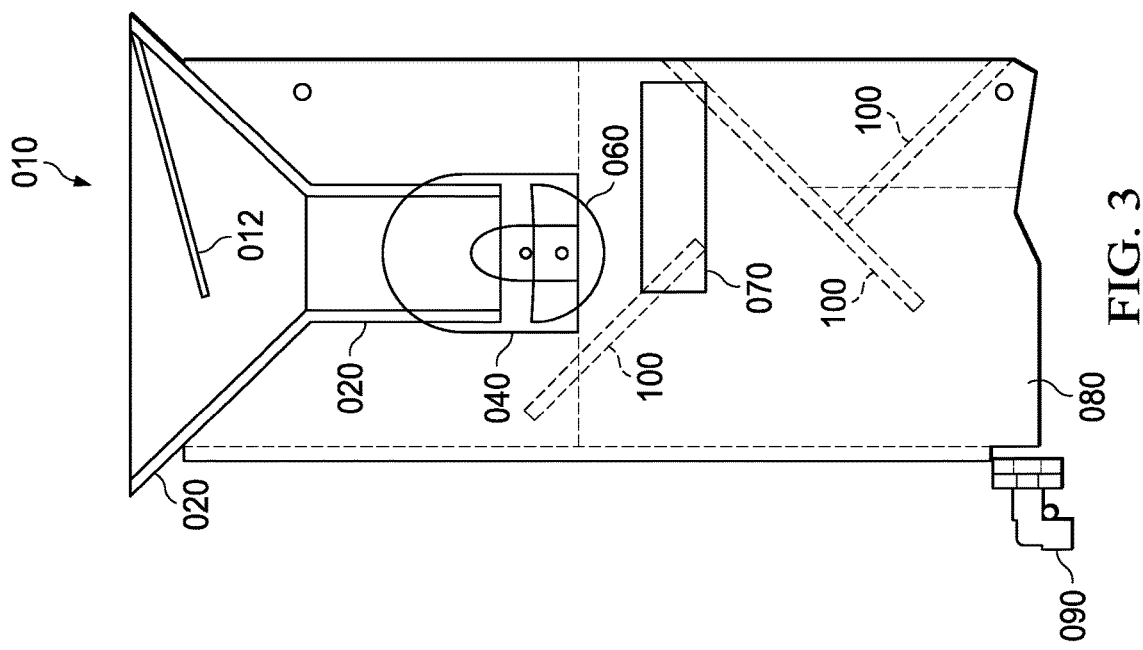
FIG. 3 is a side view of one weighing assembly.
Figure 2:
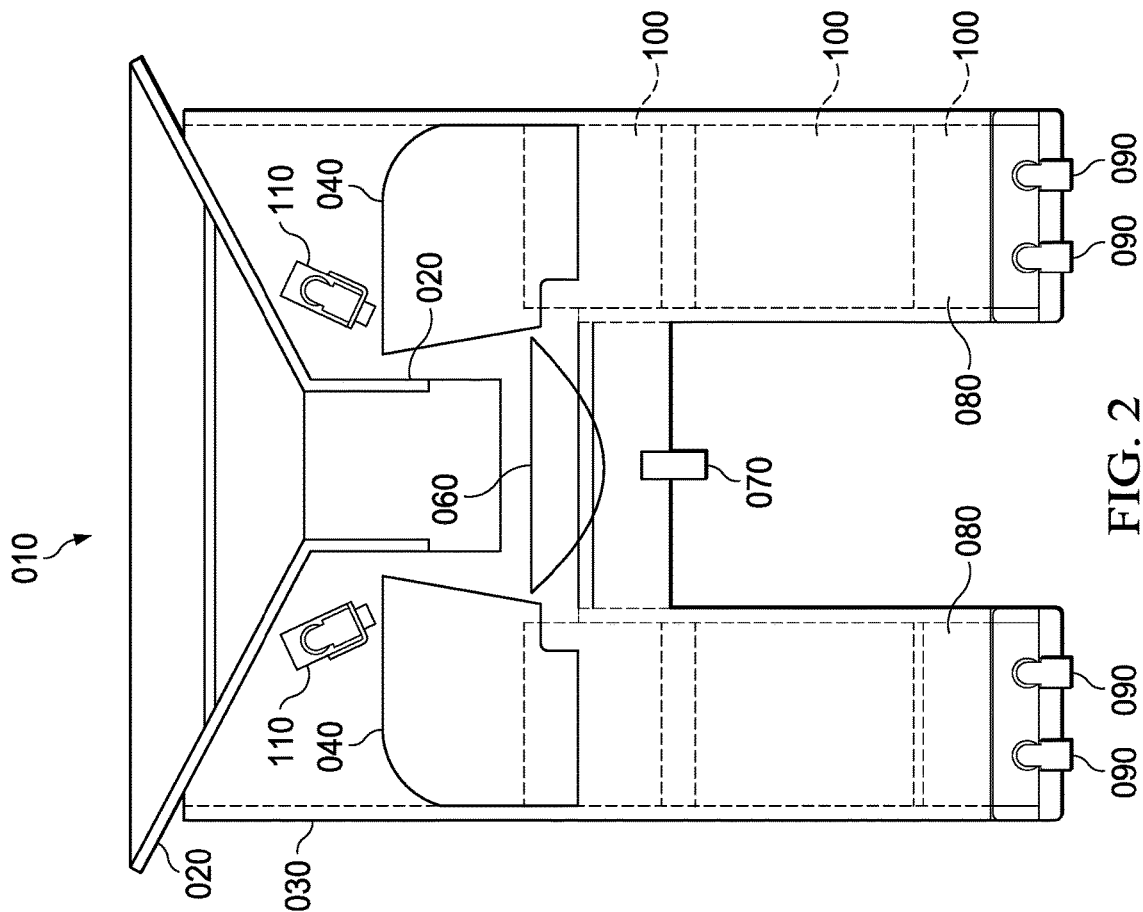
FIG. 2 is a front view of one weighing assembly.

Referring to FIG. 2, which shows a front view, and FIG. 3 which shows a side view of a preferred embodiment of one weighing assembly 010. The weighing assembly 010 is comprised of a loading hopper 020, a loading hopper deflector plate 012, a weighing platform 060, a set of elbow tube deflectors 040, a load cell 070, a set of holding bins 080, a set of upper blowers 110, a set of holding bin blowers 090, a set of lower deflector plates 100, and a weighing assembly housing 030. The disclosed invention is described below in approximate order of the path of product placed into the unit to be batched.

Referring again to FIG. 2 and FIG. 3, the loading hopper 020 is where the user places the product into the machine. Each weighing platform 060 has its own loading hopper 020, into which the user places the buds or portions. The loading hopper 020 includes one or more loading hopper deflector plates 012 to channel product to be batched and reduce mechanical stress to the product. Alternate embodiments of the loading hopper 020 may include more or less deflector plates in different configurations. The preferred embodiment of the batching funnel and loading hopper deflector plate 012 is made of translucent plastic, such as acrylic or polycarbonate, which allows for easy visual inspection and cleaning. Other embodiments may use glass, metal, ceramics, or other materials. FIG. 2 and FIG. 3 shows the sides of the loading hopper 020 as flat plates with a slope of less than 45 degrees; depending on the product to be batched this slope may be found inadequate; the disclosed invention inherently claims all shapes of loading hopper so long as they include an inclined inner edge.

Referring again to FIG. 2 and FIG. 3, product is gravitationally transferred from the bottom of the loading hopper 020 to the weighing platform 060. The preferred embodiment includes a parabolic-shaped weighing platform 060, which includes a parabolic cavity into which product is delivered from the loading hopper 020. Other embodiments may include different shaped cavities in the weighing platform, such as a box shaped weighing platform with a top-hinged flap at the exit side. In the preferred embodiment, the weighing platform is 3D printed plastic. Other embodiments may include a weighing platform made of metal, glass, ceramics, or other materials.

Referring again to FIG. 2 and FIG. 3, the weighing platform 060 is seated upon and connected to the load cell 070. In the preferred embodiment, the load cell 070 is strain gauge aluminum load cell with 0.01 gram resolution manufactured by Group Four. Other embodiments may use load cells manufactured by other companies, or other weighing devices, or other weight resolutions.

Referring again to FIG. 2 and FIG. 3, upper blowers 110 are pneumatic ports that expel short bursts of compressed gas and are directed at the weighing platform 060 such that the path of material ejected from weighing platform cavity is directed to one of the elbow tube deflectors 040. In the preferred embodiment, the upper blower nozzles are (6 mm to ⅛ inch NPT (National Pipe Thread)) and are made of PVC and brass. Other embodiments may include upper blowers of different sizes, made by different manufacturers, or made of different materials, such as metal, glass, ceramic, or other materials.

Referring again to FIG. 2 and FIG. 3, the preferred embodiment includes two upper blowers 110 which direct product from weighing platform 060 to one of two elbow tube deflectors 040. The product eventually arrives at one of two holding bins 080. In alternate embodiments, there may be any number of different paths to which product may be diverted. For example, a weighing assembly may have additional blowers and elbow tube deflectors located perpendicular to the ones shown in the figures, with corresponding additional holding bins and deflector plates. In other embodiments, product is directed from weighing platform to batching funnel without use of holding bins. It may also be possible to add a robotic element to such a system by providing for one or more blowers that are moved from location to location. An alternative embodiment includes only a single upper blower and a single elbow tube deflector.

Referring again to FIG. 2 and FIG. 3, in the preferred embodiment, the elbow tube deflector 040 is generally a right-angle of 3" polymer tube or other form of deflector. Other embodiments may use other materials, such as metal, glass, ceramic, or other materials, and may use angles of greater or lesser than ninety degrees.

Referring again to FIG. 2 and FIG. 3, product deflected by the elbow tube deflectors 040 is directed to a set of lower deflector plates 100 before it reaches the holding bin 080. In the preferred embodiment, the holding bin is made of acrylic, but other embodiments may be made of metal, glass, ceramic, or other materials.

Referring again to FIG. 2 and FIG. 3, holding bin blowers 090 are pneumatic ports that expel short bursts of compressed gas and are directed at the holding bins 080 such that the path of material ejected from weighing platform cavity is directed to one of the lower deflectors 100 and downwards to the batch funnel (FIG. 1, 150). In the preferred embodiment, the holding bin blowers are (6 mm to ⅛ inch NPT (National Pipe Thread)) made by Uxcell (www.uxcell.com) and are made of PVC and brass. Other embodiments may include upper blowers of different sizes, made by different manufacturers, or made of different materials, such as metal, glass, ceramic, or other materials.

Referring again to FIG. 2 and FIG. 3, the preferred embodiment of the weighing assembly 010 is constructed such that the loading hopper 020, weighing assembly housing 030, elbow tubes 040, deflector plates 012 and 100, and holding bin 080, are held together as a physical unit, which is referred to hereinafter as the "weighing assembly piece guide." This piece guide fits over the weighing platform 060 and blower units 090 and 110, which are mounted to a backplate (not shown). The weighing assembly piece guide is easily removable to permit cleaning of both the piece guide and underlying components and backplate.

Referring again to FIG. 1, the controller 120 is an industrial computer which comprises a processing unit, I/O ports, a display screen, and an input device such as a key pad or touch screen. Such industrial computers are available from several manufacturers, such as model #824 made by Ryco Equipment, Co. (http://rycous.com/). Other embodiments may include networked computers, non-industrial computer-implemented controllers (such as a computer running the Windows or Mac operating systems, or other logic processors or programmable devices, or purpose-built silicon commonly referred to as ASIC).

Referring again to FIG. 1, the control panel 130 is made up of electrical and electronic components housed in a stainless-steel enclosure. These components give and/or receive communication and electrical signals. The main control components of the control panel are the digital input/output modules, and analog to digital converter modules. Other components include a 24-volt DC power supply, wire terminals, and insulated copper wiring.

Figure 6:
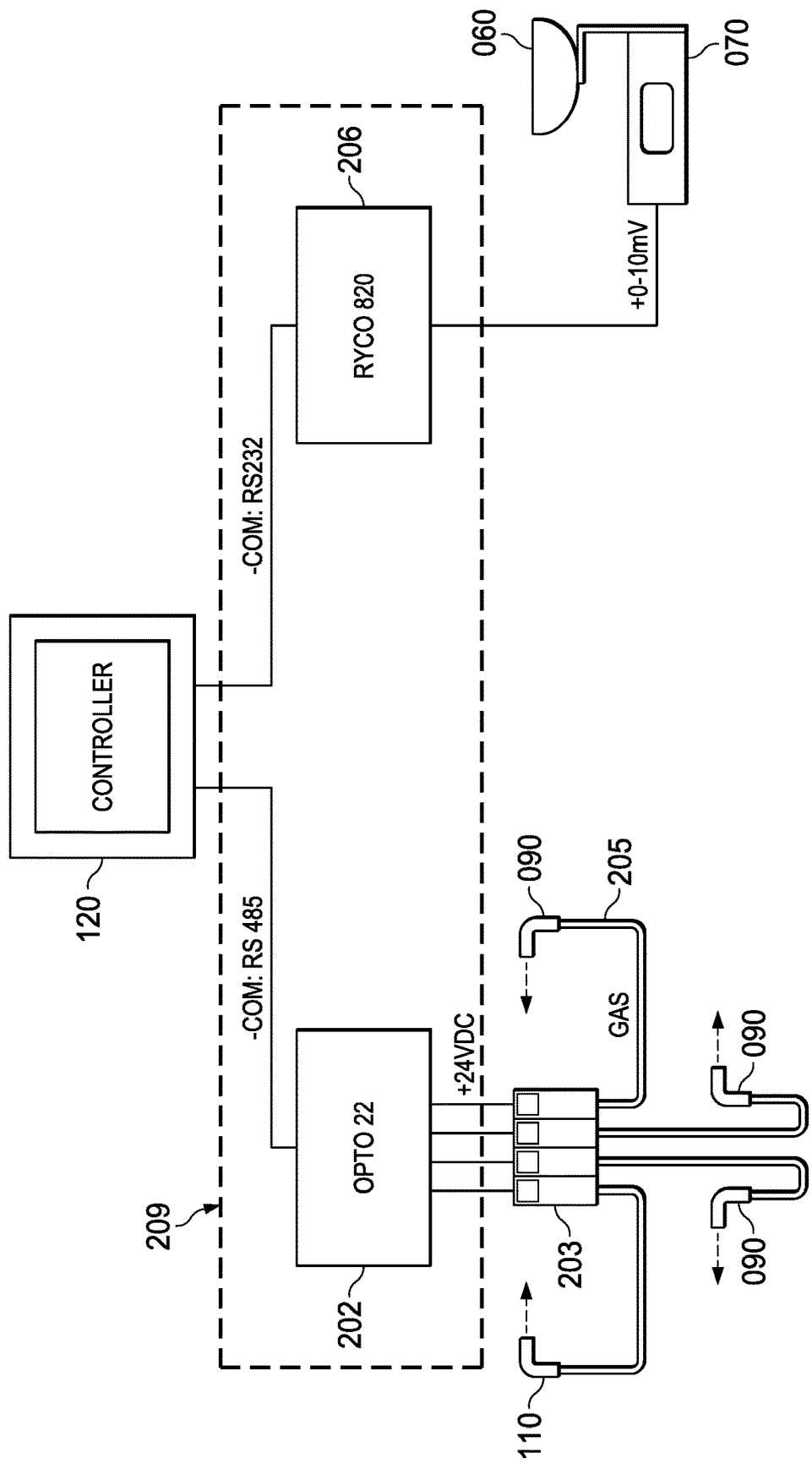
FIG. 6 is the control system of the packing station.

Referring now to FIG. 6, in a preferred embodiment, controller 120 is a Ryco 824 model controller, which controls, via RS485 serial communication, the blowers (090, 110) and responds to load cells 070, by way of an intermediate communications suite 209 (physically contained in a stainless-steel cabinet). Controller 120 commands a suite of Opto 22 digital input/output modules 202 that each control a +24 VDC line that actuates a solenoid controlled air valve 203 to send pressurized air, through an air-line 205, to a blower port 090, 110. A set of Opto 22 digital input/output modules 202 also receive an input signal to activate the holding bin blowers 090 (FIG. 2) when it is time to eject a set of holding bin contents to the output funnel 150 (FIG. 1). This command may originate from either an operator, a sensor, or connected packaging machine such as an automatic bag forming machine.

The Ryco 820 analog to digital converter modules 206 communicate to the Ryco 824 controller 120 via RS232 serial communication. These modules receive an analog signal of 0-10 millivolts from the load cells 070 (weighing contents of platforms 60), and convert this signal to a digital number which is sent to the Ryco 824 controller 120.

Referring again to FIG. 1, the batch funnel 150 is located beneath the weighing units 010. Product that drops from the weighing units 010 is collected and channeled by the batch funnel 150 to the batch funnel neck 160. In the preferred embodiment, the batch funnel is made of metal, but other embodiments may include plastic, glass, ceramic, or other material for construction. FIG. 1 shows the sides of the batch funnel 150 as flat plates with a slope of less than 45 degrees; depending on the product to be batched this slope may be found inadequate; the disclosed invention inherently claims all shapes of batch funnel so long as they include an inclined inner edge.

Referring again to FIG. 1, after passing through the batch funnel neck 160 (and, in some embodiments, a checkweigh diverter) product enters one of the dual release-nozzle 170 by gravitational action.

Figure 4:
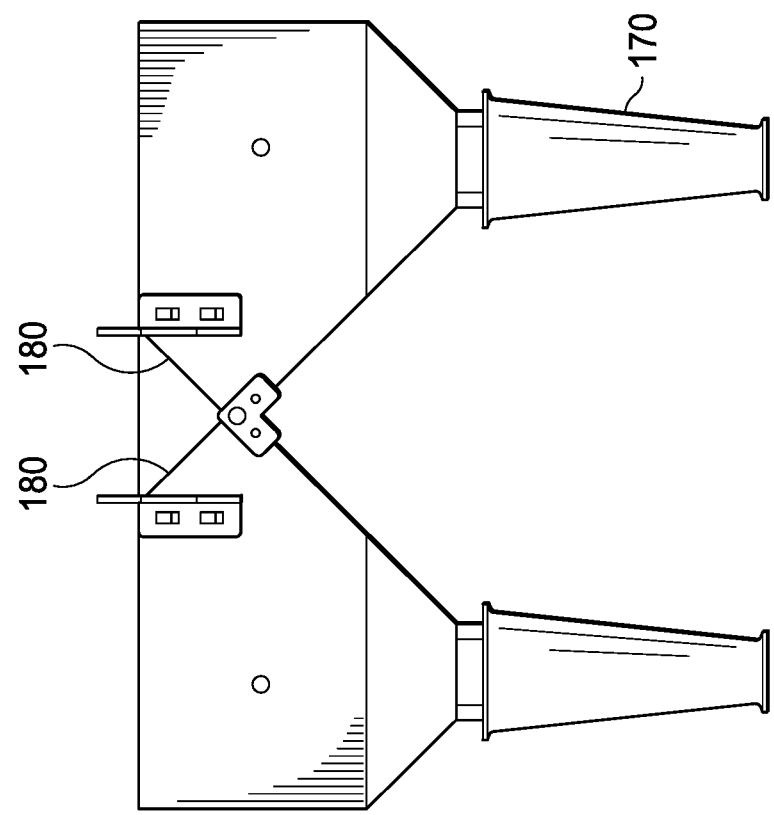
FIG. 4 is a front view of the packing station assembly.

FIG. 4 shows a front view, and FIG. 5 shows a side view of the preferred embodiment of a packing station assembly. In the preferred embodiment, the batch funnel neck 160 includes a diverter 180, whereby product may be directed to one or more release-nozzles 170. Another embodiment includes a checkweigh diverter in which a measuring method such as described above or otherwise, provides a means of ensuring that the proper quantity of product will be dispensed.

Preferred Method of Use

The disclosed invention requires an operator to program the controller. The operator starts by programming the target weight (1 gram, 2 grams, 4 grams, etc.) and acceptable over-weight (for example 0.1 gram), yielding as noted above, the target weight range. Alternatively, the operator may choose several desired batch weights; in this way, multiple outputs may be achieved at the same time with greater range of inputs. This may be particularly useful in embodiments that include more than one exit point (packing station). Other programming options, such as maximum product weight variance will be programmed by the operator.

In the preferred embodiment, product is loaded manually by the operator into a loading hopper 020. For example, if used to batch buds, the operator may separate and load a portion of a bud or, more typically load an entire bud, or a few buds, depending on the bud size range, into a loading hopper 020. In the preferred embodiment, a light in each weighing assembly 010 indicates when the weighing platform 060 is clear and ready to accept product. The operator drops the product into the loading hopper 020 which funnels the product to the weighing platform 060. The operator repeats this operation, using the different hoppers 020, and typically does not use the same hopper more than two times in a single batching operation.

In some embodiments, the loading of buds into the loading hopper 020 is done automatically rather than by the operator. Such embodiments may employ robotic means, such as a robotic "arm" which picks up and drops product; other embodiments may include a conveyor belt system with diverters that push product from the conveyor belt into the loading hopper.

Once the load cell 070 detects product on the weighing platform 060, the controller 120 waits for the weight to stabilize then records the weight to the controller's memory.

The controller 120 then sends the product to an empty holding bin 080. The controller 120 activates an upper blower 110 which gives a short burst of gas directed at the product in the weighing platform 060. The burst of gas accelerates the product out of the weighing platform 060 to the interior of an elbow tube deflector 040 which directs the product downward toward the deflector plates 012. The amount of time the blower 110 is activated and intensity of the burst of gas is determined by the controller 120 based on the weight of product on weighing platform 060.

As referred to herein, the term "gas" may be a clean stable gas from a bottle, such as nitrogen, compressed air, or any other gas used in the art.

Product then drops from the elbow tube deflector 040 to one or more lower deflector plates 090. The lower deflector plates 090 act to control the fall of the product as it descends and direct it toward a holding bin 080.

This process is repeated until the controller 120 finds a match between a combination of bin content weights and the target weight range. Once an acceptable batch weight is found, the controller sends a signal to release the product in the bins that make up the fitting combination. Each of the holding bin blowers that correspond to the holding bins containing product making up the combination then releases a short burst of gas which moves the product into the batch funnel 150. Product travels to the bottom of the batch funnel and into one or more packing stations below.

The controller 120 may also be programmed to release product in bins that have not been batched after a specified period. Such rejected material may consist of individual weighments that are greater than 80% of the targeted batch weight and are unlikely to find a mate or mates to equal the targeted batch weight. Other rejected material may consist of product that has been held in a holding bin for several batch cycles and is unlikely to be find a mate or mates to equal the targeted batch weight. Also, during a startup, end, or flush cycle, the machine will blow out any material in the weighing platforms and holding bins. A reject diverter chute (not shown) will remain open during these cycles.

An optional check weigh hopper can be installed in place of the reject diverter in the neck of the batch funnel. The purpose of this check weigh hopper is to verify that the batch meets weight specifications. If the batch meets specification, the front "clam shell" of the weigh hopper opens and releases the batch to the packing station. If the batch does not meet specifications, the rear "clam shell" opens and releases the product to the reject chute.

The packing station is the final step for batched product. In the preferred embodiment, an operator places an empty packaging container, such as a jar or resealable bag, under the release-nozzle 170 of the packing station. In some embodiments, an indicator light (not shown) will illuminate when the batch is arriving. In some embodiments, the operator will have to take some action, such as opening a valve, to permit the product to move from the release-nozzle 170 into the empty packaging container. The operator then removes the filled container and places a new empty container below the release-nozzle 170. In the preferred embodiments, the operator will then notify the controller 120, such as by pressing a button or switch, to indicate that the packing station is ready for the next batch. In some embodiments this is done automatically, such as by action of removing the filled package or insertion of a new empty package.

Another embodiment of the disclosed invention includes an automatic or semi-automatic packaging machine, such as a form fill machine or a vertical forming machine. In such embodiment, the controller will send a signal to the packaging machine indicating that the batch is arriving. The packaging machine will then send a signal back to the controller once it is ready for the next batch.

The invention claimed is:

1. A method of delivering a set of nonuniform *cannabis* inflorescences ("buds") that fit within a target weight range, comprising:
    (a) iteratively:
        (i) weighing a bud and automatically placing the weighed bud into one holding bin, out of a set of holding bins;
        (ii) automatically determining if the weight of any combination of the contents of the set of holding bins fits within the target weight range;
    (b) when a combination of the contents of the holding bins fits within the target weight range, combining these holding bin contents together; and
    (c) wherein said weighing is performed by a set of weighing platforms and wherein a plurality of holding bins are located beneath each weighing platform from said set of weighing platforms, and wherein said placing the weighed bud into one holding bin is performed by activating a blower that is positioned to blow said bud into a pathway that leads to said one of said set of holding bins.

2. The method of claim 1, wherein in the step of placing the weighed bud into a holding bin, the holding bin does not include any other buds.

3. The method of claim 1, wherein there is a first holding bin and a second holding bin per weighing platform, said first holding bin located on a first side of weighing platform and said second holding bin located on a second side of said weighing platform, opposed to said first side of said holding bin and wherein said first blower is positioned and directed to blow buds into a first vertical pathway that leads to said first holding bin and said second blower is positioned and directed to blow buds into a second vertical pathway that leads to said second holding bin.

4. The method of claim 3, wherein said weighing platforms are shaped as shallow bowls.

5. The method of claim 1, wherein automatically determining if the weight of any combination of the contents of the set of holding bins fits within the target weight range is performed by a computer implemented controller.

6. The method of claim 1, wherein combining said holding bin contents together is accomplished by a blower in each holding bin, and said blowers in said holding bins corresponding to said combination of contents that fits within said weight range are commanded to blow out the holding bin contents, to travel to a common location.

7. The method of claim 6, wherein said blowers blow said buds to a primary funnel that leads to a common location.

8. An apparatus for delivering a set of nonuniform product pieces that fit within a target weight range, comprising:
    (a) at least one upwardly facing product piece entrance;
    (b) at least one weighing platform, shaped as an upwardly facing shallow bowl, positioned beneath said product piece entrance;
    (c) for each weighing platform, a load cell positioned to weigh the contents of each weighing platform;
    (d) a vertical pathway leading from the product piece entrance to said weighing platform, so that product pieces dropped through said product piece entrance are guided to said weighing platform;
    (e) a set of holding bins, each positioned to receive product pieces from one of said at least one weighing platforms;
    (f) a set weighing-platform air blowers, each of which is positioned and adapted to blow a set of product pieces from said weighing platform into a unique one of said holding bins; and
    (g) at least one holding bin air blower for each holding bin, capable of ejecting product pieces in said holding bin out of said holding bin;
    (h) a holding bins exit assembly, configured to guide product pieces ejected from said holding bins to a common exit; and
    (i) a computer implemented control unit, including computer readable memory, responsive to said weighing platform and controlling all said air blowers, programmed to:
        (i) select and activate a weighing-platform air blower to blow a set of product pieces from said weighing platform to a holding bin, after weight information is received from said weighing platform;
        (ii) maintaining in computer memory the weight of the contents of each said holding bin and computing the sum of weights of every possible combination of holding bin contents and comparing each said sum of weights with a weight range; and
        (iii) when a sum of weights falls within said weight range, activating said holding bin blowers corresponding to said holding bins whose contents sum to the weight range, to eject said product pieces into said holding bins exit assembly to said common exit.

9. The apparatus of claim 8, wherein said at least one upwardly facing product piece entrance and said at least one weighing platform, includes a plurality of product piece entrances, each located above a unique weighing platform, and a plurality of holding bins positioned to receive the contents from each weighing platform, but where all of said holding bins are connected to said holding bin exit assembly.

10. The apparatus of claim 9, wherein said weighing platforms are located above said holding bins, so that said weighing platform blowers can blow said product pieces off said weighing platform and the product pieces will fall into one of said holding bins.

11. The apparatus of claim 8, wherein said holding bins exit assembly comprises a funnel sized and positioned to receive any product piece ejected from any one of said holding bins.

12. The apparatus of claim 8, wherein said weighing platform and said holding bins are sized to accept product pieces from 0.1 grams to 4 grams, up to six centimeters across.

13. The apparatus of claim 8, wherein said load cell has a precision of no greater than 0.1 grams.

14. A method of delivering a set of nonuniform *cannabis* inflorescences ("buds") that fit within a target weight range, comprising:
  (a) iteratively:
    (i) weighing a bud and automatically placing the weighed bud into one holding bin, out of a set of holding bins;
    (ii) automatically determining if the weight of any combination of the contents of the set of holding bins fits within the target weight range;
  (b) when a combination of the contents of the holding bins fits within the target weight range, combining these holding bin contents together; and
  (c) wherein said blowers blow said buds to a primary funnel that leads to a weighing platform that weighs the combined contents of said bins to verify that it equals the sum of the weights of the holding bin contents that were combined.

15. A method of delivering a set of nonuniform *cannabis* inflorescences ("buds") that fit within a target weight range, comprising:
  (a) iteratively:
    (i) weighing a bud and automatically placing the weighed bud into one holding bin, out of a set of holding bins;
    (ii) automatically determining if the weight of any combination of the contents of the set of holding bins fits within the target weight range;
  (b) when a combination of the contents of the holding bins fits within the target weight range, combining these holding bin contents together; and
  (c) wherein said blowers blow said buds to a primary funnel that leads to a diverter that can be switched to direct the buds to any one of a set of exit release-nozzles.

16. The method of claim 15, wherein said set of exit nozzles equals two exit release-nozzles.

\* \* \* \* \*